(12) United States Patent
Park et al.

(10) Patent No.: US 12,089,161 B2
(45) Date of Patent: *Sep. 10, 2024

(54) WAKEUP SIGNAL MONITORING WINDOW

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,516

(22) Filed: Feb. 9, 2023

(65) Prior Publication Data

US 2023/0189153 A1 Jun. 15, 2023

Related U.S. Application Data

(63) Continuation of application No. 16/949,326, filed on Oct. 26, 2020, now Pat. No. 11,729,717.

(60) Provisional application No. 62/937,688, filed on Nov. 19, 2019.

(51) Int. Cl.
*H04W 52/02* (2009.01)
*H04W 72/23* (2023.01)

(52) U.S. Cl.
CPC ....... *H04W 52/0235* (2013.01); *H04W 72/23* (2023.01)

(58) Field of Classification Search
CPC ............ H04L 5/0053; H04W 52/0235; H04W 72/042; H04W 72/1289; Y02D 30/70

USPC ......................................................... 370/311
See application file for complete search history.

(56) References Cited

U.S. PATENT DOCUMENTS

| | | | |
|---|---|---|---|
| 11,606,749 B2* | 3/2023 | Nam ................. | H04W 52/0258 |
| 2018/0270756 A1 | 9/2018 | Bhattad et al. | |
| 2018/0332533 A1 | 11/2018 | Bhattad et al. | |
| 2019/0014533 A1 | 1/2019 | Abedini et al. | |
| 2019/0037495 A1 | 1/2019 | John Wilson et al. | |
| 2020/0092813 A1* | 3/2020 | Kim ................. | H04W 52/0274 |
| 2021/0007050 A1* | 1/2021 | Lin ........................ | H04W 72/23 |
| 2021/0084590 A1* | 3/2021 | Nam ................. | H04W 52/0216 |
| 2021/0092682 A1* | 3/2021 | Xu ........................ | H04W 72/23 |
| 2021/0099954 A1* | 4/2021 | Agiwal ................. | H04W 76/28 |
| 2021/0144638 A1* | 5/2021 | Liao ...................... | H04W 76/28 |

(Continued)

FOREIGN PATENT DOCUMENTS

| | | |
|---|---|---|
| WO | 2018174635 A1 | 9/2018 |
| WO | 2018204799 A1 | 11/2018 |

OTHER PUBLICATIONS

Taiwan Search Report—TW109137226—TIPO—Nov. 15, 2023.

(Continued)

*Primary Examiner* — Robert J Lopata
(74) *Attorney, Agent, or Firm* — Harrity & Harrity, LLP

(57) ABSTRACT

Various aspects of the present disclosure generally relate to wireless communication. In some aspects, a user equipment (UE) may determine a monitoring window for monitoring a search space set for a physical downlink control channel (PDCCH) wakeup signal (WUS), where the monitoring window is a portion of a configured monitoring window for the search space set. The UE may monitor the WUS search space set within the monitoring window for the PDCCH WUS. Numerous other aspects are provided.

30 Claims, 8 Drawing Sheets

(56) References Cited

U.S. PATENT DOCUMENTS

| | | |
|---|---|---|
| 2021/0153127 A1 | 5/2021 | Park et al. |
| 2021/0321446 A1* | 10/2021 | Lee ............... H04W 72/54 |
| 2022/0022137 A1* | 1/2022 | Xue ............... H04W 24/08 |
| 2022/0030565 A1* | 1/2022 | Xu ................ H04W 72/23 |
| 2022/0039014 A1* | 2/2022 | Shi ............. H04W 52/0235 |
| 2022/0124623 A1* | 4/2022 | Seo ............... H04W 72/23 |
| 2022/0174598 A1* | 6/2022 | Seo ............... H04W 52/02 |
| 2022/0182936 A1* | 6/2022 | Maleki .......... H04W 52/0235 |
| 2023/0232331 A1* | 7/2023 | Seo ............ H04W 52/0229 |
| | | 370/328 |

OTHER PUBLICATIONS

International Search Report and Written Opinion—PCT/US2020/070701—ISA/EPO—Feb. 1, 2021.

Nokia, et al., "On PDCCH-Based Power Saving Techniques," 3GPP Draft, 3GPP TSG RAN WG1 meeting #99, R1-1913111, 3rd Generation Partnership Project (3GPP), Mobile Competence Centre, 650, Route Des Lucioles, F-06921, Sophia-Antipolis Cedex, France, vol. RAN WG1. No. Reno. Nevada. USA, Nov. 18, 2019-Nov. 22, 2019, Nov. 8, 2019 (Nov. 8, 2019), XP051820308, 14 pages, paragraph [02.3].

* cited by examiner

WAKEUP SIGNAL MONITORING WINDOW

CROSS-REFERENCE TO RELATED APPLICATION

This Patent Application is a continuation of U.S. patent application Ser. No. 16/949,326, filed Oct. 26, 2020, entitled "WAKEUP SIGNAL MONITORING WINDOW," and claims priority to U.S. Provisional Patent Application No. 62/937,688, filed on Nov. 19, 2019, entitled "WAKEUP SIGNAL MONITORING WINDOW," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for a wakeup signal monitoring window.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes determining a monitoring window for monitoring a search space set for a physical downlink control channel (PDCCH) wakeup signal (WUS), where the monitoring window is a portion of a configured monitoring window for the search space set; and monitoring the search space set within the monitoring window for the PDCCH WUS.

In some aspects, a UE for wireless communication includes a memory; and one or more processors operatively coupled to the memory, the memory and the one or more processors configured to: determine a monitoring window for monitoring a search space set for a PDCCH WUS, where the monitoring window is a portion of a configured monitoring window for the search space set; and monitor the search space set within the monitoring window for the PDCCH WUS.

In some aspects, a non-transitory computer-readable medium storing a set of instructions for wireless communication includes one or more instructions that, when executed by one or more processors of a UE, cause the UE to: determine a monitoring window for monitoring a search space set for a PDCCH WUS, where the monitoring window is a portion of a configured monitoring window for the search space set; and monitor the search space set within the monitoring window for the PDCCH WUS.

In some aspects, an apparatus for wireless communication includes means for determining a monitoring window for monitoring a search space set for a PDCCH WUS, where the monitoring window is a portion of a configured monitoring window for the search space set; and means for monitoring the search space set within the monitoring window for the PDCCH WUS.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
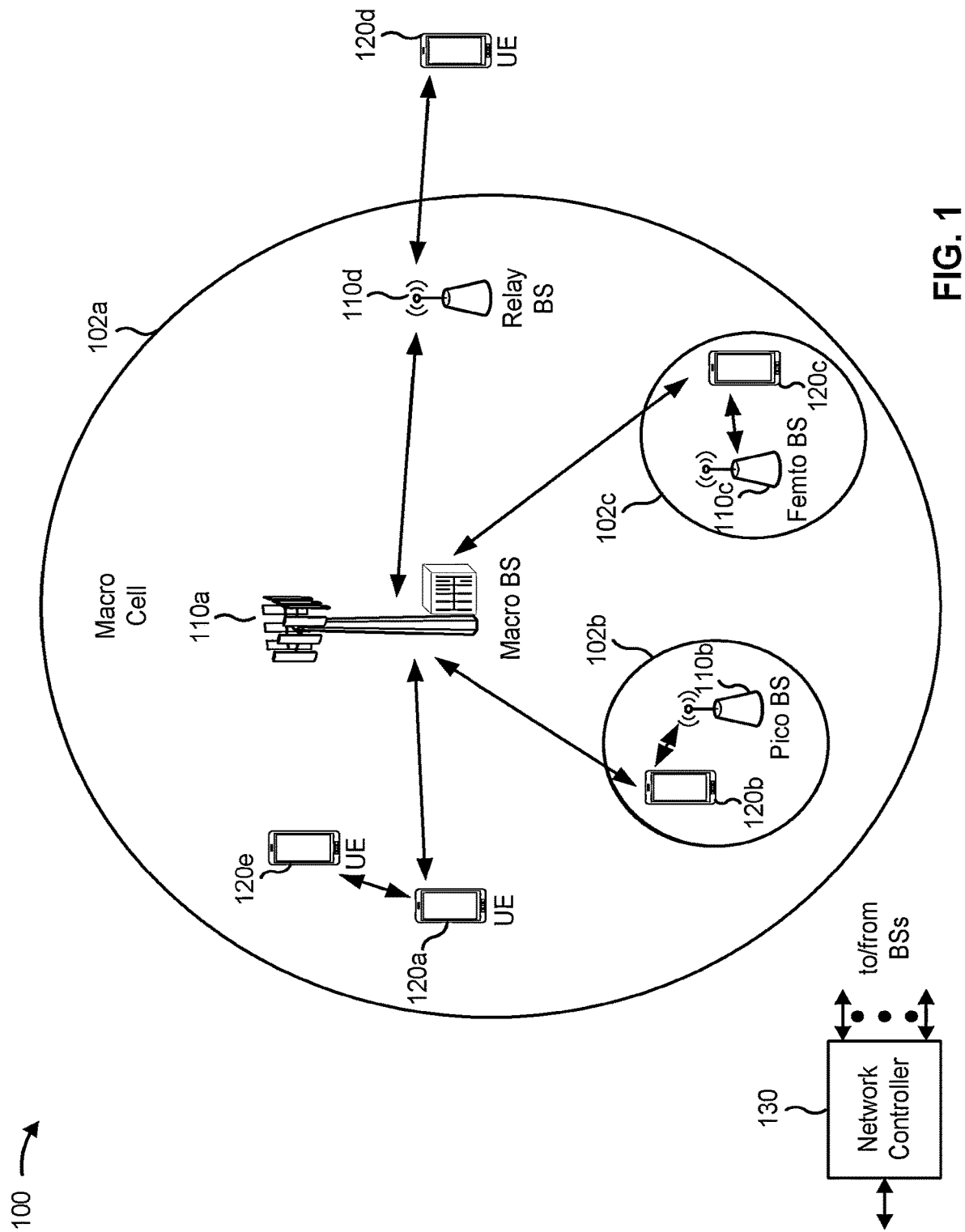
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
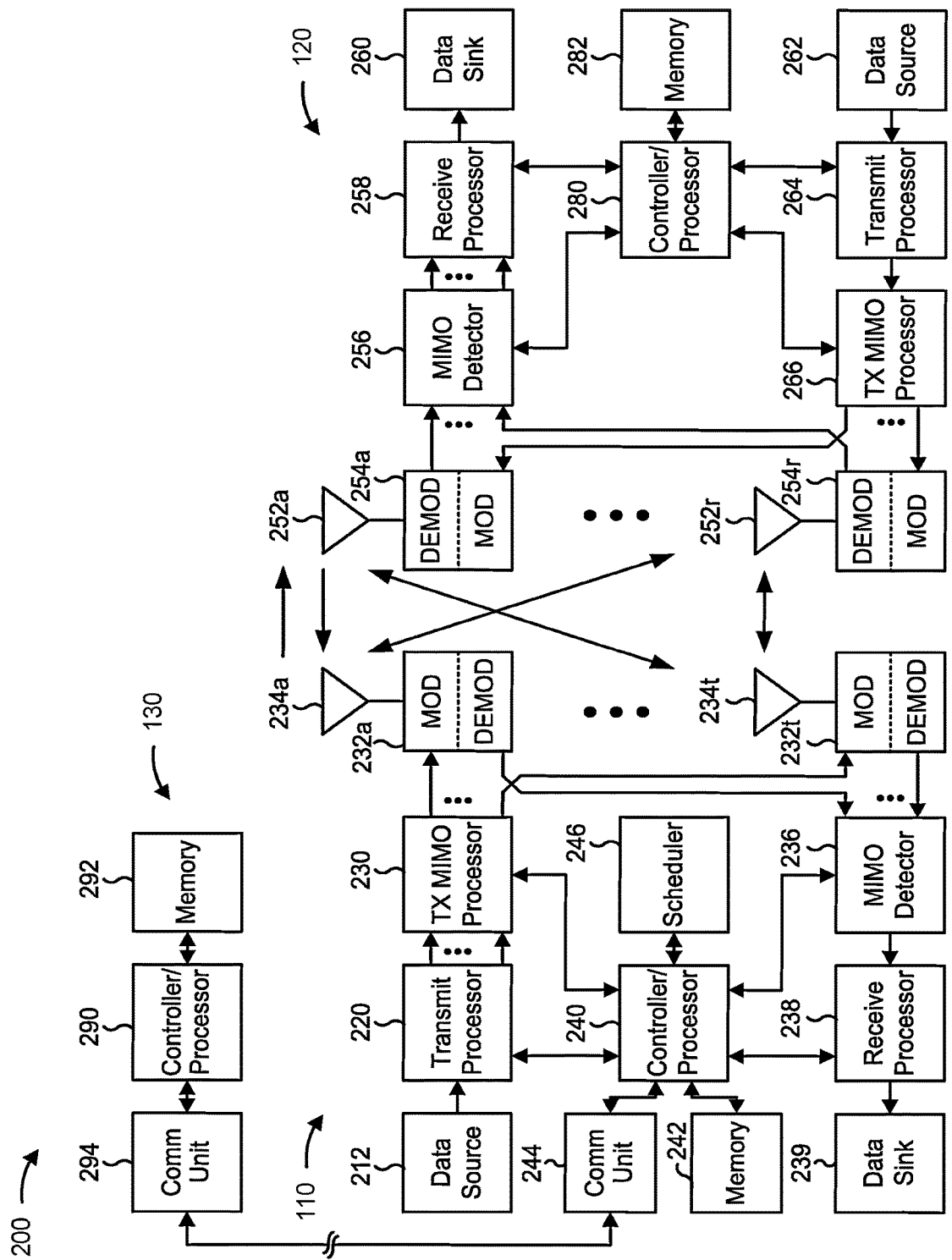
FIG. 2 is a diagram illustrating an example of a base station in communication with a UE in a wireless communication network, in accordance with various aspects of the present disclosure.

FIG. 2 shows a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a wakeup signal (WUS) monitoring window, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, and/or other processes as described herein. A scheduler 246 may schedule UEs for data transmission on the downlink and/or uplink.

In some aspects, UE 120 may include means for determining a monitoring window for monitoring a search space set for a physical downlink control channel (PDCCH) WUS, where the monitoring window is a portion of a configured monitoring window for the search space set, means for monitoring the search space set within the monitoring window for the PDCCH WUS, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
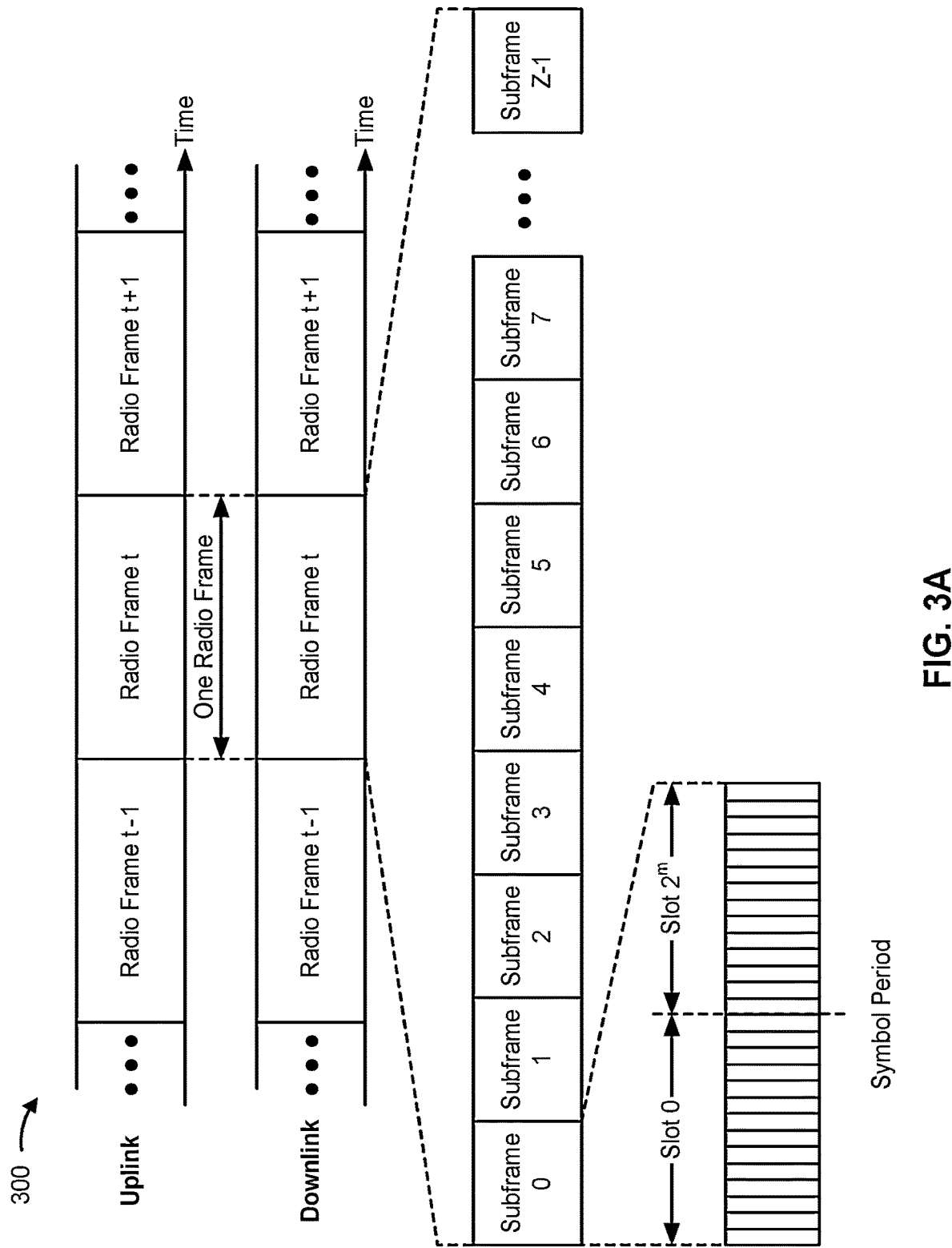
FIG. 3A is a diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
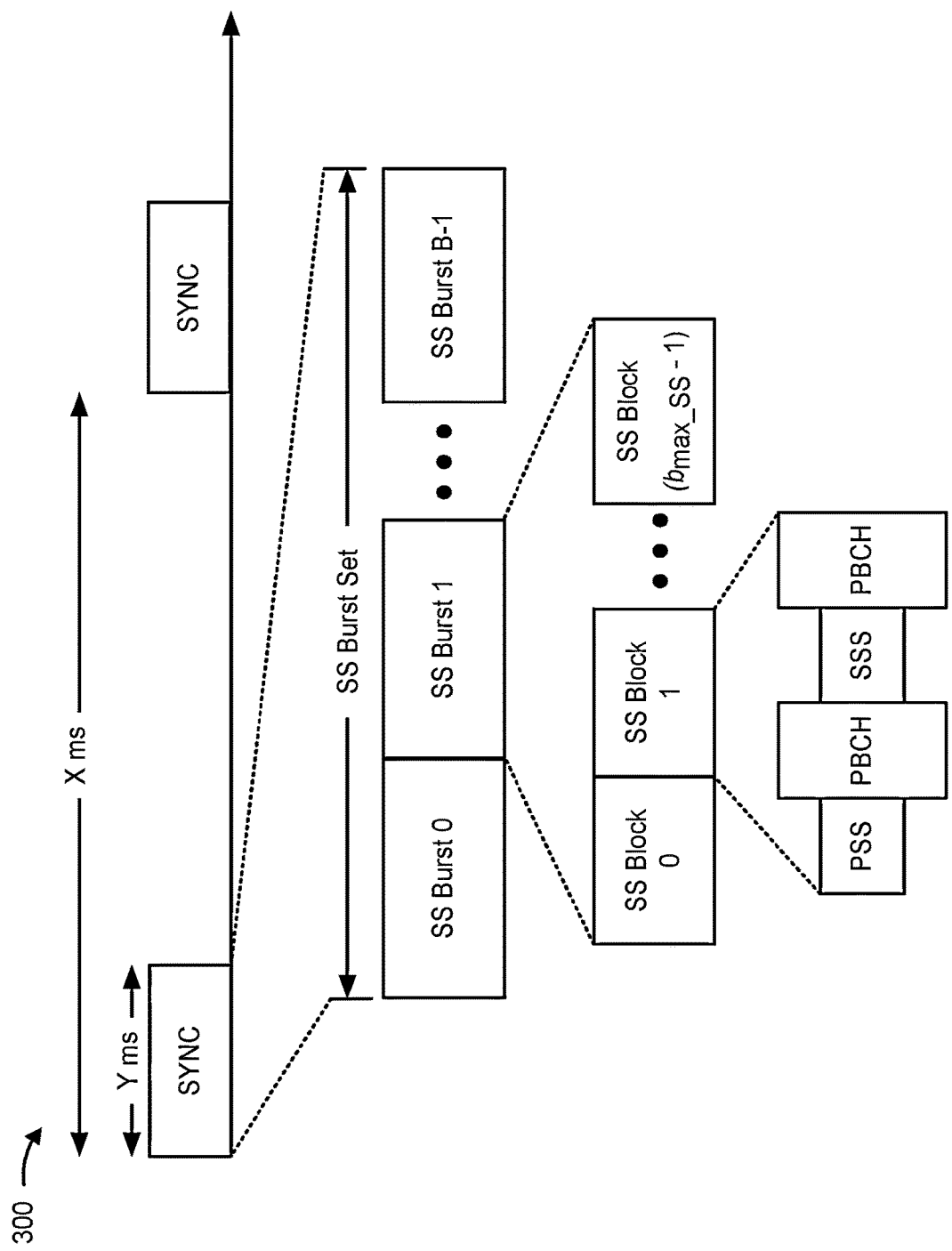
FIG. 3B is a diagram illustrating an example synchronization communication hierarchy in a wireless communication network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
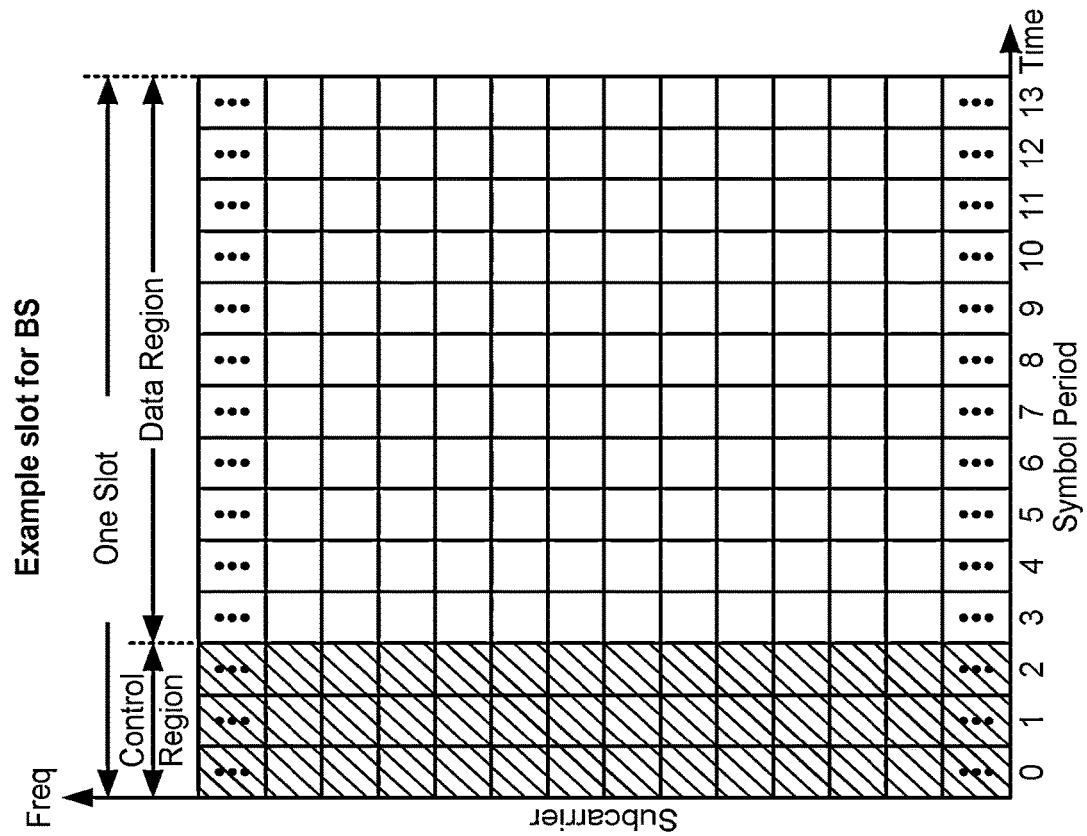
FIG. 4 is a diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE (e.g., UE 120) may use a discontinuous reception (DRX) cycle to conserve power. One type of DRX cycle is a connected-mode DRX (C-DRX) cycle. During a period of traffic inactivity, a UE may switch to C-DRX operation to save power. A C-DRX cycle may be configured based at least in part on an inactivity timer, a short DRX timer, a short DRX cycle, and a long DRX cycle. The UE may wake up from a sleep state based at least in part on the short DRX cycle and the long DRX cycle to monitor a PDCCH. The period in which the UE awakes based at least in part on the DRX cycles may be referred to as an ON duration. Other than the ON durations, the UE may remain asleep, which may be referred to as an OFF state or OFF duration. During the OFF duration, the UE may not be expected by the network (e.g., BS 110, network controller 130, and/or the like) to transmit or receive signals. If the UE detects a PDCCH during an ON duration, the UE may remain active to transmit or receive data. Otherwise, the UE may go to sleep at the end of the ON duration. Thus, the UE may remain asleep while traffic is not scheduled for the UE, thereby conserving power that would otherwise be used to check for a PDCCH on each scheduling occasion.

A UE may further conserve power by using a wakeup signal (WUS) technique. When using a WUS technique, the UE may wake up for the ON duration of the C-DRX cycle only when a WUS is received before the ON duration. Once the UE has received the WUS, the UE may activate a modem for the next ON duration. Thus, the UE may save power and processor resources. Furthermore, by skipping ON durations when no WUS has been received, the UE conserves additional power.

A WUS may be implemented using various types of signals, sequences, transmissions, and/or the like. For example, a WUS may be reference signal-based (e.g., may be implemented by a channel state information reference signal (CSI-RS), a tracking reference signal (TRS), a demodulation reference signal (DMRS), and/or the like), may be PDCCH-based (e.g., may be implemented by a PDCCH communication), may be sequence-based (e.g., may be implemented by a Gold sequence, a Zadoff Chu sequence, and/or the like), and/or the like. A PDCCH WUS may be more robust, relative to other types of WUSs, in that a PDCCH WUS may have built-in coding and cyclic redundancy check (CRC) mechanisms.

To detect a PDCCH WUS, the UE may monitor numerous PDCCH candidate locations configured for the UE, and may perform blind decoding of the PDCCH candidate locations to determine whether the PDCCH WUS is located in any of the PDCCH candidate locations. A base station may configure a plurality of PDCCH candidate locations for respective search space sets associated with the UE. The base station may configure a plurality of search space sets (e.g., including a periodicity and offset for search space occasions, a duration (e.g., a quantity of slots) for a search space occasion, a starting symbol in a slot for a search space occasion, and/or the like) for respective control resource sets (CORESETs) assigned to the UE. The base station may configure a plurality of CORESETs for respective bandwidth parts (BWPs) associated with the UE, and the UE may be assigned a plurality of BWPs by the base station.

In some aspects, the base station may configure a monitoring window (e.g., a time window) for the UE. The monitoring window configured for the UE may include one or more of the PDCCH candidate locations configured for the UE (e.g., a subset of the PDCCH candidate locations configured for the UE) that the UE is to monitor for a PDCCH WUS. The monitoring window may be configured for the UE as a time interval, a quantity of PDCCH candidate locations, a quantity of slots, a quantity of control channel elements, and/or the like. The UE may monitor a search space set for the PDCCH WUS in the monitoring window configured for the UE (e.g., only monitoring occasions that fall within the monitoring window are monitored for the PDCCH WUS). The monitoring window may start at a configured offset (PS_offset) before a start of a DRX ON duration. However, in some cases, the UE may not be enabled to monitor the monitoring window configured for the UE. For example, an end of the monitoring window may be too close to a start of an ON duration, such that the UE has insufficient time to wake up for the ON duration following the monitoring window. In some cases, the monitoring window configured for the UE may be inefficient. For example, the monitoring window may have a duration that is similar to a duration of an ON duration, thereby minimizing power savings achievable by the WUS technique.

Some techniques and apparatuses described herein provide a monitoring window that does not conflict with a subsequent ON duration of a UE and/or provide a monitoring window that is minimized in duration for efficiency. In some aspects, the UE may monitor a portion of a monitoring window configured for the UE according to one or more criteria. In some aspects, the UE may determine a monitoring window as a function of one or more parameters (e.g., UE capability parameters, monitoring parameters, and/or the like). In this way, the UE may monitor for a PDCCH WUS using a monitoring window that is valid and improves power savings of the UE.

Figure 5:
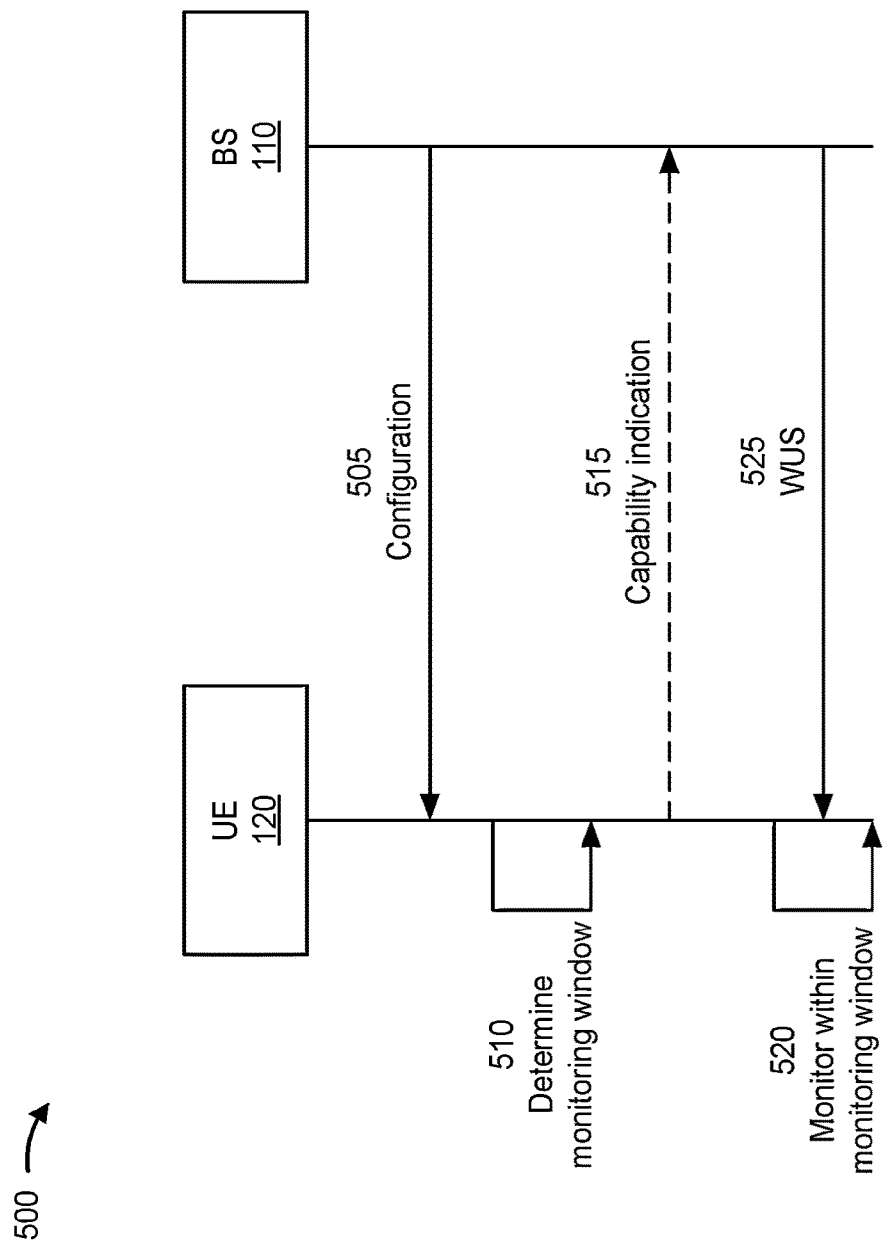
FIG. 5 is a diagram illustrating an example of monitoring a wakeup signal monitoring window, in accordance with various aspects of the present disclosure.

FIG. 5 is a diagram illustrating an example 500 of monitoring a WUS monitoring window, in accordance with various aspects of the present disclosure. As shown in FIG. 5, a UE 120 may communicate with a BS 110. In particular, UE 120 may monitor for a PDCCH according to a C-DRX procedure that uses a PDCCH WUS technique.

As shown in FIG. 5, and by reference number 505, BS 110 may transmit, and UE 120 may receive, a configuration. For example, BS 110 may transmit the configuration via radio resource control (RRC) signaling. In some aspects, the configuration may indicate a search space set. For example, the configuration may indicate a periodicity and an offset for a search space occasion, a duration (e.g., a quantity of slots) of a search space occasion, symbols of a slot for one or more PDCCH candidate locations (i.e., PDCCH monitoring occasions), and/or the like.

In some aspects, the configuration may indicate a monitoring window for monitoring the search space set, where only PDCCH candidate locations in the monitoring window are to be monitored for a PDCCH WUS. In some aspects, the configuration may identify a start of the monitoring window by an offset from a start of an ON duration (e.g., an ON duration configured by a C-DRX configuration). In some aspects, the configuration may identify an end of the monitoring window by a duration for the monitoring window (e.g., from the start of the monitoring window). In some aspects, the configuration may identify an end of the monitoring window by a quantity of search space occasions that are to be monitored (e.g., from the start of the monitoring window). For example, the quantity of search space occasions may be one (e.g., only the first search space occasion after the start of the monitoring window is to be monitored) or the quantity of search space occasions may be all search space occasions between the start of the monitoring window and the start of the ON duration. As described above, in some aspects, the monitoring window configured by the configuration may be invalid or inefficient.

As shown by reference number 510, UE 120 may determine a monitoring window for WUS monitoring. In some aspects, the monitoring window may be a portion (e.g., a sub-window) of the monitoring window configured by the configuration (e.g., the portion of the monitoring window may have a lesser duration than the monitoring window). For example, UE 120 may determine the monitoring window to be a portion of the configured monitoring window based at least in part on a determination that the configured monitoring window does not satisfy one or more criteria. In some aspects, the one or more criteria may be static (e.g., preconfigured for UE 120).

In some aspects, the one or more criteria may indicate a threshold quantity (e.g., a maximum quantity) of slots. Accordingly, the monitoring window (e.g., the portion of the configured monitoring window) may include up to the threshold quantity of slots of the configured monitoring window. That is, UE 120 may determine that the monitoring window is to include up to the threshold quantity of slots of the configured monitoring window (e.g., based at least in part on a determination that the configured monitoring window includes more than the threshold quantity of slots).

In some aspects, the one or more criteria may indicate a threshold quantity (e.g., a maximum quantity) of PDCCH candidate locations for which decoding is to be attempted by UE 120. In other words, the one or more criteria may indicate a threshold quantity of PDCCH candidate locations that are to be monitored by UE 120. Accordingly, the monitoring window (e.g., the portion of the configured monitoring window) may include up to the threshold quantity of PDCCH candidate locations of the configured monitoring window. That is, UE 120 may determine that the monitoring window is to include up to the threshold quantity of PDCCH candidate locations of the configured monitoring window (e.g., based at least in part on a determination that the configured monitoring window includes more than the threshold quantity of PDCCH candidate locations).

In some aspects, the one or more criteria may indicate a threshold quantity (e.g., a maximum quantity) of control channel elements (CCEs) for which channel estimation is to be performed by UE 120. In other words, the one or more criteria may indicate a threshold quantity of CCEs that are to be monitored by UE 120. Accordingly, the monitoring window (e.g., the portion of the configured monitoring window) may include up to the threshold quantity of CCEs of the configured monitoring window. That is, UE 120 may determine that the monitoring window is to include up to the threshold quantity of CCEs of the configured monitoring window (e.g., based at least in part on a determination that the configured monitoring window includes more than the threshold quantity of CCEs).

In some aspects, the one or more criteria may indicate that one or more last slots, one or more last search space occasions, one or more last PDCCH candidate locations, and/or the like, of the configured monitoring window is not to be monitored (e.g., to provide a guard interval between the monitoring window and the ON duration). Accordingly, in some aspects, the monitoring window (e.g., the portion of the configured monitoring window) may include a set of the slots of the configured monitoring window, and may not include one or more last slots (e.g., time intervals) of the configured monitoring window. That is, the monitoring window may not include one or more search space occasions associated with the last slot of the configured monitoring window. In some aspects, the monitoring window (e.g., the portion of the configured monitoring window) may include a set of the search space occasions of the configured monitoring window, and may not include one or more last search space occasions of the configured monitoring window. In some aspects, the monitoring window (e.g., the portion of the configured monitoring window) may include a set of the PDCCH candidate locations of the configured monitoring window, and may not include one or more last PDCCH candidate locations of the configured monitoring window.

In some aspects, UE 120 may determine a monitoring window based at least in part on (e.g., as a function of) one or more parameters, such as one or more parameters relating to a capability of UE 120, one or more parameters configured by BS 110, and/or the like. In some aspects, UE 120 may determine the monitoring window based at least in part on (e.g., as a function of) an energy consumption of UE 120. As an example, UE 120 may determine the monitoring window as a function of at least one of a proportion of an energy consumption of UE 120 during an inactive time period (e.g., an OFF duration) to an energy consumption of UE 120 during an active time period (e.g., an ON duration), a duration of the active time period, a minimum monitoring window duration, a maximum monitoring window duration, and/or the like.

For example, UE 120 may determine the monitoring window according to Equation 1:

$$T_{Window} = \min\left\{\max\left\{\frac{\beta}{\alpha}T_{ON}, T_{min}\right\}, T_{max}\right\} \quad \text{Equation 1}$$

where $T_{Window}$ is a duration of the monitoring window, $T_{ON}$ is a duration of the ON duration, $T_{min}$ is a minimum monitoring window duration, $T_{max}$ is a maximum monitoring window duration, $\alpha$ is a proportion of an energy consumption of UE 120 during an inactive time period to an energy consumption of UE 120 during an active time period, and $\beta$ is a scaling factor.

In some aspects, BS 110 may transmit (e.g., via RRC signaling), and UE 120 may receive, a configuration that indicates values for $T_{min}$, $T_{max}$, and/or $\beta$. In other words, BS 110 may determine values for $T_{min}$, $T_{max}$, and/or $\beta$. In some aspects, the configuration may indicate a value for $T_{min}$ and may not indicate a value for $T_{max}$. In such a case, $T_{max}$ may be a default value, such as a value corresponding to an offset for determining a start of a configured monitoring window, as described above. In some aspects, the configuration may indicate a value for $T_{max}$ and may not indicate a value for $T_{min}$. In such a case, $T_{min}$ may be a default value, such as one (1). In some aspects, $T_{ON}$ may be a value indicated by a DRX configuration transmitted by BS 110 and received by UE 120. In some aspects, BS 110 may transmit, and UE 120 may receive, an indication that UE 120 is to determine the monitoring window based at least in part on the one or more parameters (e.g., in connection with the configuration for $T_{min}$, $T_{max}$, and/or $\beta$, the DRX configuration, and/or the like).

In some aspects, as shown by reference number 515, UE 120 may transmit (e.g., via UE assistance information, uplink control information, a medium access control (MAC) control element (CE), and/or the like) an indication of a capability of UE 120 to BS 110 to enable BS 110 to determine the monitoring window being used by UE 120. For example, the indication may include a value of α. In some cases, the value of α may change over time (e.g., due to a traffic level of UE 120). Accordingly, UE 120 may determine the monitoring window dynamically (e.g., upon changes to the value of α), and may transmit corresponding indications of the value of α to BS 110.

As shown by reference number 520, UE 120 may monitor the search space set within the monitoring window determined by UE 120. Similarly, as shown by reference number 525, BS 110 may transmit the PDCCH WUS in the search space set within the monitoring window being used by UE 120. Accordingly, BS 110 may determine the monitoring window being used by UE 120. In some aspects, BS 110 may determine the monitoring window being used by UE 120 based at least in part on the one or more criteria used by UE 120 to determine the monitoring window, as described above. In some aspects, BS 110 may determine the monitoring window being used by UE 120 based at least in part on the one or more parameters used by UE 120 to determine the monitoring window, as described above. For example, BS 110 may determine the monitoring window based at least in part on an indication of a capability of UE 120 (e.g., α) received from UE 120 (as well as values for $T_{ON}$, $T_{min}$, $T_{max}$, and/or β determined by BS 110).

In some aspects, UE 120 may detect the PDCCH WUS in the search space set based at least in part on monitoring the search space set within the monitoring window. In this way, UE 120 may monitor for, and detect, a PDCCH WUS using a monitoring window that is valid and improves power savings of UE 120.

As indicated above, FIG. 5 is provided as an example. Other examples may differ from what is described with respect to FIG. 5.

Figure 6:
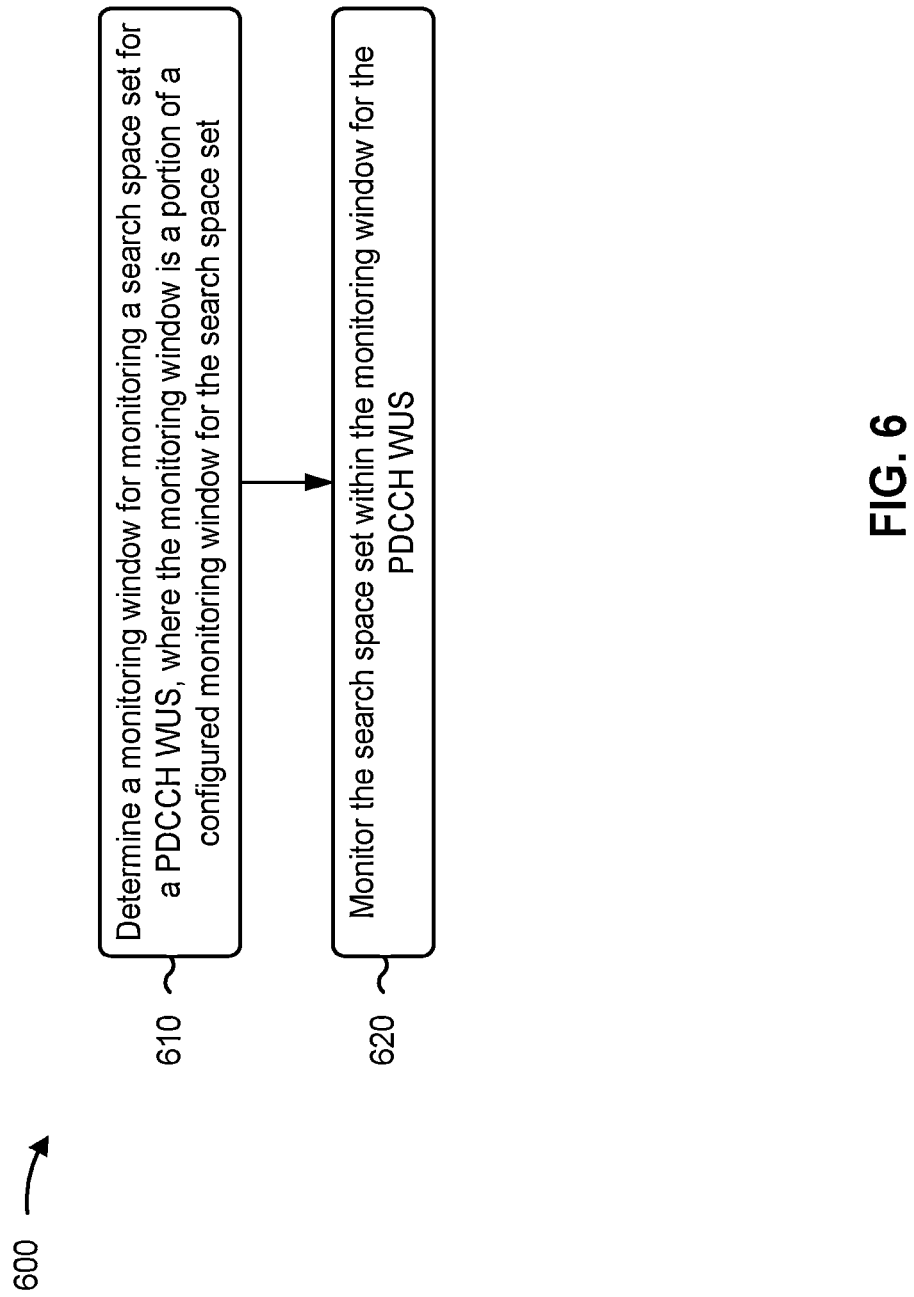
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with a wakeup signal monitoring window.

As shown in FIG. 6, in some aspects, process 600 may include determining a monitoring window for monitoring a search space set for a PDCCH WUS, where the monitoring window is a portion of a configured monitoring window for the search space set (block 610). For example, the UE (e.g., using controller/processor 280 and/or the like) may determine a monitoring window for monitoring a search space set for a PDCCH WUS, as described above. In some aspects, the monitoring window is a portion of a configured monitoring window for the search space set.

As further shown in FIG. 6, in some aspects, process 600 may include monitoring the WUS search space set within the monitoring window for the PDCCH WUS (block 620). For example, the UE (e.g., using antenna 252, DEMOD 254, MIMO detector 256, receive processor 258, controller/processor 280, and/or the like) may monitor the WUS search space set within the monitoring window for the PDCCH WUS, as described above.

Process 600 may include additional aspects, such as any single aspect or any combination of aspects described below and/or in connection with one or more other processes described elsewhere herein.

In a first aspect, the monitoring window is a portion of a configured monitoring window for monitoring the WUS search space set.

In a second aspect, alone or in combination with the first aspect, the monitoring window includes up to a threshold quantity of slots of the configured monitoring window. In a third aspect, alone or in combination with one or more of the first and second aspects, the monitoring window includes up to a threshold quantity of PDCCH candidate locations of the configured monitoring window. In a fourth aspect, alone or in combination with one or more of the first through third aspects, the monitoring window includes up to a threshold quantity of control channel elements of the configured monitoring window.

In a fifth aspect, alone or in combination with one or more of the first through fourth aspects, the monitoring window does not include one or more last slots of the configured monitoring window. In a sixth aspect, alone or in combination with one or more of the first through fifth aspects, the monitoring window does not include one or more last search space occasions of the configured monitoring window. In a seventh aspect, alone or in combination with one or more of the first through sixth aspects, the monitoring window does not include one or more last PDCCH candidate locations of the configured monitoring window.

In an eighth aspect, alone or in combination with one or more of the first through seventh aspects, determining the monitoring window includes determining the monitoring window as a function of a parameter of the UE. In a ninth aspect, alone or in combination with one or more of the first through eighth aspects, the parameter relates to an energy consumption of the UE. In a tenth aspect, alone or in combination with one or more of the first through ninth aspects, process 600 includes transmitting an indication of the parameter.

In an eleventh aspect, alone or in combination with one or more of the first through tenth aspects, determining the monitoring window includes determining the monitoring window as a function of at least one of a proportion of an energy consumption of the UE during an inactive time period to an energy consumption of the UE during an active time period, a duration of the active time period, a minimum monitoring window duration, or a maximum monitoring window duration.

In a twelfth aspect, alone or in combination with one or more of the first through eleventh aspects, the configured monitoring window is a time window, configured for the UE, that includes one or more PDCCH candidate locations for monitoring for the PDCCH WUS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
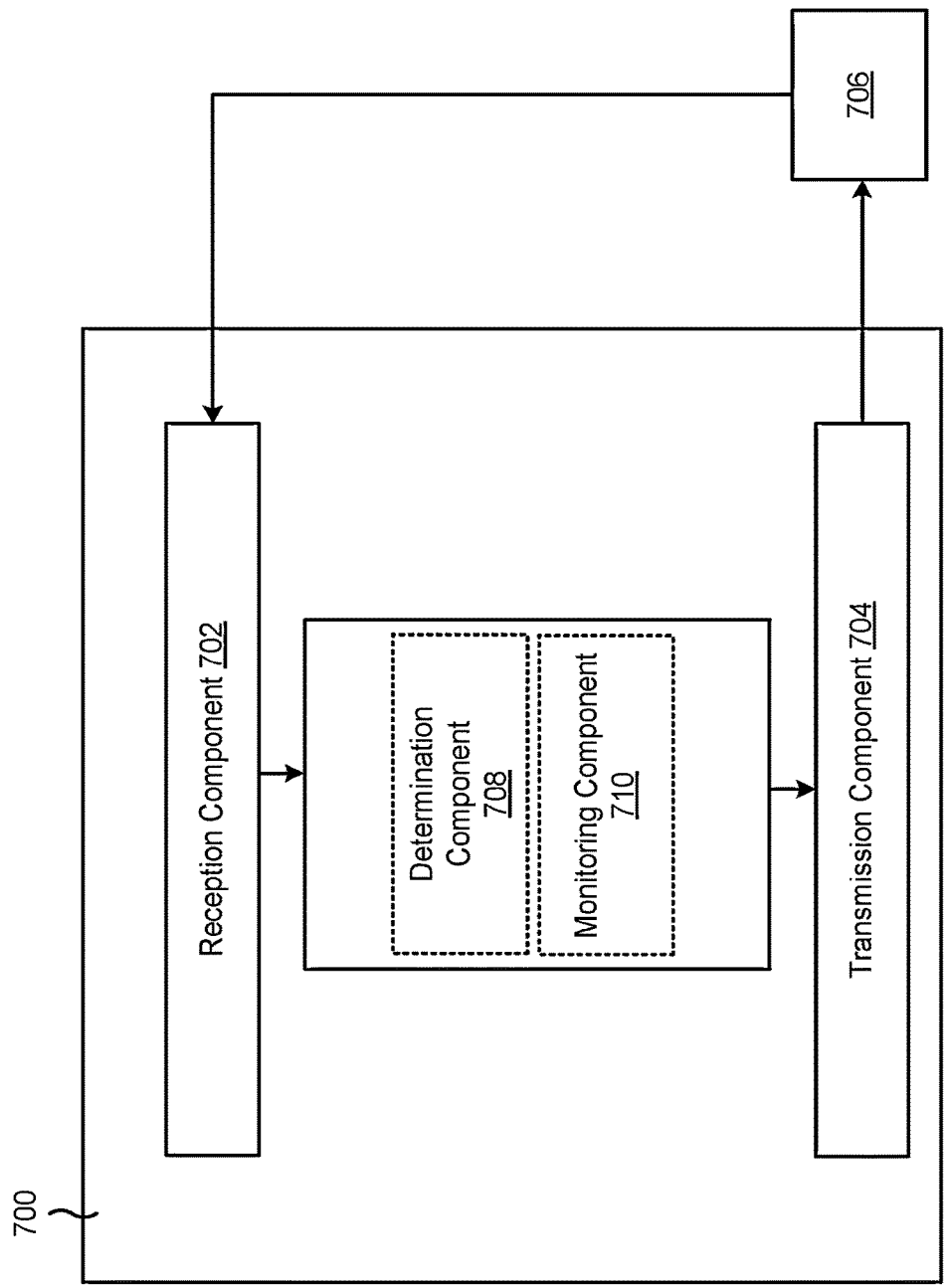
FIG. 7 is a diagram illustrating an example apparatus for wireless communication, in accordance with various aspects of the present disclosure.

FIG. 7 is a diagram illustrating an example apparatus 700 for wireless communication, in accordance with various aspects of the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a monitoring component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The determination component 708 may determine a monitoring window for monitoring a search space set for a PDCCH WUS. In some aspects, the monitoring window is a portion of a configured monitoring window for the search space set. In some aspects, the determination component 708 may include a controller/processor, a memory, or a combination thereof, of the UE described above in connection with FIG. 2. The monitoring component 710 may monitor the search space set within the monitoring window for the PDCCH WUS. In some aspects, the monitoring component 710 may include one or more antennas, a demodulator, a MIMO detector, a receive processor, a controller/processor, a memory, or a combination thereof, of the UE described above in connection with FIG. 2.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
one or more memories; and
one or more processors, coupled to the one or more memories, configured to:
transmit an indication, the indication being of a time interval prior to an end of a configured monitoring window for monitoring for a physical downlink control channel (PDCCH) wakeup signal (WUS);
determine a monitoring window for monitoring for the PDCCH WUS, wherein the monitoring window is a portion of the configured monitoring window, and
wherein an end of the monitoring window is based at least in part on the time interval; and
monitor within the monitoring window for the PDCCH WUS.

2. The UE of claim 1, wherein the configured monitoring window is a time window, configured for the UE, that includes one or more PDCCH candidate locations for monitoring for the PDCCH WUS.

3. The UE of claim 1, wherein the monitoring window includes up to a threshold quantity of slots of the configured monitoring window.

4. The UE of claim 1, wherein the monitoring window includes up to a threshold quantity of PDCCH candidate locations of the configured monitoring window.

5. The UE of claim 1, wherein the monitoring window includes up to a threshold quantity of control channel elements of the configured monitoring window.

6. The UE of claim 1, wherein the time interval is defined by a number of slots.

7. The UE of claim 1, wherein the monitoring window does not include one or more last search space occasions of the configured monitoring window.

8. The UE of claim 1, wherein the monitoring window does not include one or more last PDCCH candidate locations of the configured monitoring window.

9. The UE of claim 1, wherein the monitoring window does not include one or more last slots of the configured monitoring window.

10. The UE of claim 1, wherein the one or more processors, to determine the monitoring window, are configured to:
determine the monitoring window as a function of at least one of a duration of an active time period, a minimum monitoring window duration, or a maximum monitoring window duration.

11. A network node for wireless communication, comprising:
one or more memories; and
one or more processors, coupled to the one or more memories, configured to:
receive an indication, the indication being of a time interval prior to an end of a configured monitoring window for monitoring for a physical downlink control channel (PDCCH) wakeup signal (WUS);
determine a monitoring window for monitoring for the PDCCH WUS,
wherein the monitoring window is a portion of the configured monitoring window, and
wherein an end of the monitoring window is based at least in part on the time interval; and
transmit the PDCCH WUS within the monitoring window.

12. The network node of claim 11, wherein the configured monitoring window is a time window, configured for a user equipment, that includes one or more PDCCH candidate locations for monitoring for the PDCCH WUS.

13. The network node of claim 11, wherein the monitoring window includes up to a threshold quantity of slots of the configured monitoring window.

14. The network node of claim 11, wherein the monitoring window includes up to a threshold quantity of PDCCH candidate locations of the configured monitoring window.

15. The network node of claim 11, wherein the monitoring window includes up to a threshold quantity of control channel elements of the configured monitoring window.

16. The network node of claim 11, wherein the time interval is defined by a number of slots.

17. The network node of claim 11, wherein the monitoring window does not include one or more last search space occasions of the configured monitoring window.

18. The network node of claim 11, wherein the monitoring window does not include one or more last PDCCH candidate locations of the configured monitoring window.

19. The network node of claim 11, wherein the monitoring window does not include one or more last slots of the configured monitoring window.

20. The network node of claim 11, wherein the one or more processors, to determine the monitoring window, are configured to:
determine the monitoring window as a function of at least one of a duration of an active time period, a minimum monitoring window duration, or a maximum monitoring window duration.

21. A method of wireless communication performed by a user equipment (UE), comprising:
transmitting an indication, the indication being of a time interval prior to an end of a configured monitoring window for monitoring for a physical downlink control channel (PDCCH) wakeup signal (WUS);
determining a monitoring window for monitoring for the PDCCH WUS,
wherein the monitoring window is a portion of the configured monitoring window, and
wherein an end of the monitoring window is based at least in part on the time interval; and
monitoring within the monitoring window for the PDCCH WUS.

22. The method of claim 21, wherein the configured monitoring window is a time window, configured for the UE, that includes one or more PDCCH candidate locations for monitoring for the PDCCH WUS.

23. The method of claim 21, wherein the monitoring window includes up to a threshold quantity of slots of the configured monitoring window.

24. The method of claim 21, wherein the time interval is defined by a number of slots.

25. The method of claim 21, wherein the monitoring window does not include one or more last slots of the configured monitoring window.

26. A method of wireless communication performed by a network node, comprising:
receiving an indication, the indication being of a time interval prior to an end of a configured monitoring window for monitoring for a physical downlink control channel (PDCCH) wakeup signal (WUS);
determining a monitoring window for monitoring for the PDCCH WUS,
wherein the monitoring window is a portion of the configured monitoring window, and
wherein an end of the monitoring window is based at least in part on the time interval; and
transmitting the PDCCH WUS within the monitoring window.

27. The method of claim 26, wherein the configured monitoring window is a time window, configured for a user equipment, that includes one or more PDCCH candidate locations for monitoring for the PDCCH WUS.

28. The method of claim 26, wherein the monitoring window includes up to a threshold quantity of slots of the configured monitoring window.

29. The method of claim 26, wherein the time interval is defined by a number of slots.

30. The method of claim 26, wherein the monitoring window does not include one or more last slots of the configured monitoring window.

\* \* \* \* \*